(12) United States Patent
Serita et al.

(10) Patent No.: US 7,870,489 B2
(45) Date of Patent: Jan. 11, 2011

(54) CONTENT DISPLAY CONTROL APPARATUS AND CONTENT DISPLAY CONTROL METHOD

(75) Inventors: Yoichiro Serita, Shizuoka (JP); Hirotoshi Maegawa, Tokyo (JP)

(73) Assignee: Sony Computer Entertainment Inc., Tokyo (JP)

( * ) Notice: Subject to any disclaimer, the term of this patent is extended or adjusted under 35 U.S.C. 154(b) by 299 days.

(21) Appl. No.: 11/495,190

(22) Filed: Jul. 28, 2006

(65) Prior Publication Data

US 2007/0061855 A1    Mar. 15, 2007

(30) Foreign Application Priority Data

Sep. 13, 2005   (JP)   ............................. 2005-265414

(51) Int. Cl.
G06F 3/00   (2006.01)
G09G 5/00   (2006.01)

(52) U.S. Cl. ........................ 715/730; 715/712; 345/629; 345/632

(58) Field of Classification Search ................ 345/629, 345/632; 715/712, 730
See application file for complete search history.

(56) References Cited

U.S. PATENT DOCUMENTS

| | | | | |
|---|---|---|---|---|
| 6,847,977 B2 * | 1/2005 | Abajian | ...................... | 707/102 |
| 7,243,133 B2 * | 7/2007 | Armstrong et al. | ........... | 709/213 |
| 7,266,832 B2 * | 9/2007 | Miller | .......................... | 725/34 |
| 7,269,582 B2 * | 9/2007 | Winter et al. | ................... | 707/1 |
| 7,269,837 B1 * | 9/2007 | Redling et al. | ................. | 725/43 |
| 7,331,057 B2 * | 2/2008 | Eldering et al. | ............... | 725/32 |
| 7,334,251 B2 * | 2/2008 | Rodriguez et al. | ............. | 725/42 |
| 7,340,760 B2 * | 3/2008 | Wachtfogel et al. | ........... | 725/34 |
| 7,380,259 B1 * | 5/2008 | Schroeder | ..................... | 725/35 |
| 7,415,514 B2 * | 8/2008 | Shiga | .......................... | 709/223 |
| 7,614,073 B2 * | 11/2009 | Hugenberg et al. | .......... | 725/114 |
| 2002/0016961 A1 * | 2/2002 | Goode | ........................... | 725/9 |
| 2008/0215985 A1 * | 9/2008 | Batchelder et al. | .......... | 715/731 |

(Continued)

FOREIGN PATENT DOCUMENTS

JP    11102243    4/1999

(Continued)

OTHER PUBLICATIONS

Notification of Reason(s) for Refusal dated Jul. 27, 2010, and an English-language translation thereof, from the corresponding Japanese Application No. 2005-265414.

Primary Examiner—William L Bashore
Assistant Examiner—David Phantana-angkool
(74) Attorney, Agent, or Firm—Katten Muchin Rosenman LLP

(57) ABSTRACT

A interface unit, which while displaying a current content, receives input of reference information specifying a target content that will be switched to and viewed from the current content. A content sequence creation unit creates a content sequence in which one or more intermediate contents, which have been identified as related to at least one of the current content and the target content, are inserted between the current content and the target content. A display control unit controls content display by passing data to a display apparatus so that a content display is made in accordance with the created content sequence starting from the current content, proceeding through the intermediate contents which are inserted in order, and finally ending with the target content.

14 Claims, 11 Drawing Sheets

U.S. PATENT DOCUMENTS

2009/0210796 A1* 8/2009 Bhogal et al. ............... 715/730
2009/0313122 A1* 12/2009 Funk et al. ............... 705/14.53
2010/0023960 A1* 1/2010 Hasson ..................... 725/14

FOREIGN PATENT DOCUMENTS

| | | |
|---|---|---|
| JP | 2000172610 | 6/2000 |
| JP | 2003528377 | 9/2003 |
| JP | 2004341677 | 12/2004 |
| WO | 0169367 | 9/2001 |

* cited by examiner

| REFERENCE 1 | METADATA 1, METADATA 4 |
| REFERENCE 2 | METADATA 1, METADATA 2, METADATA 5 |
| REFERENCE 3 | METADATA 2, METADATA 3 |
| REFERENCE 4 | METADATA 3 |
| ⋮ | ⋮ |

| METADATA 1 | REFERENCE 1, REFERENCE 2 |
| METADATA 2 | REFERENCE 2, REFERENCE 3 |
| METADATA 3 | REFERENCE 3, REFERENCE 4 |
| ⋮ | ⋮ |

FIG.5A

| | REFERENCE 1 | METADATA 1 | 71 |
|---|---|---|---|
| METADATA 1 | REFERENCE 2 | METADATA 2 | 72 |
| METADATA 2 | REFERENCE 3 | METADATA 3 | 73 |
| METADATA 3 | REFERENCE 4 | | 74 |

FIG.5B (REFERENCE 1, REFERENCE 2, REFERENCE 3, REFERENCE 4,)

FIG.9

| | METADATA | BROADER CONCEPT METADATA | RELATED METADATA |
|---|---|---|---|
| REFERENCE 1 | METADATA a | BROADER CONCEPT METADATA au | RELATED METADATA a1 |
| | | | RELATED METADATA a2 |
| | | | RELATED METADATA a3 |
| | METADATA b | BROADER CONCEPT METADATA bu | RELATED METADATA b1 |
| | | | RELATED METADATA b2 |
| | ...... | ...... | ...... |
| REFERENCE 2 | METADATA c | BROADER CONCEPT METADATA cu | RELATED METADATA c1 |
| | ...... | ...... | RELATED METADATA c2 |

26

CONTENT DISPLAY CONTROL APPARATUS AND CONTENT DISPLAY CONTROL METHOD

BACKGROUND OF THE INVENTION

1. Field of the Invention

This invention relates to a content display control apparatus and a content display control method.

2. Description of the Related Art

Various types of content such as video are stored in storage media such as DVD (Digital Versatile Disc) from which they are accessed and used in various forms. For instance, they are played on a media player, streamed on the Internet, or played on a personal computer.

On a media player or a personal computer display, when switching from one content to another, or when switching from an Internet portal site to a specific content, a wait time is required. During this wait time, still images or moving images are sometimes inserted to indicate that the content to be switched to is being prepared. In addition, for smooth image transition with image continuity in the switching process, when switching to the display of a different content, an image effect or the like is sometimes used for interpolation between the image to be switched from and the image to be switched to.

However, the image inserted during the wait time of the content switching process is often predetermined and standardized which may cause a user to lose interest. The interpolation done between the content to be switched from and the content to be switched to results in maintaining image continuity and thereby modulates an abrupt on-screen display change, but since this connecting image appears to carry no meaning a user may still be left with the impression that the displayed content was switched in a noncontiguous manner.

SUMMARY OF THE INVENTION

The present invention has been achieved in view of the foregoing problems. It is thus a general purpose of the present invention to provide a content display control apparatus and a content display control method to enable smooth switching of displayed content.

To solve the foregoing problems, a content display control apparatus according to one of the embodiments of the present invention comprises: an interface unit which, while a current content is being displayed, receives input of reference information specifying a target content that is switched to from the current content; a sequence creation unit which creates a content sequence in which one or more intermediate contents, which have been identified as related to at least one of the current content and the target content, are inserted between the current content and the target content; and a display control unit which displays a content in accordance with the created content sequence starting with the current content, proceeding through the one or more intermediate contents which are inserted in order, and finally ending with the target content.

Here, "metadata" shall refer to some sort of content related data, examples of which include a content keyword, a characteristic amount based on a content analysis, a content creation time, a content creation location, identification information of a user who has referenced a content, and a history of content-to-content shifting by a user.

The one or more intermediate content may be linked like a chain via metadata. "Being linked like a chain via metadata" shall refer to a situation where metadata for adjacent contents within a content sequence are mutually related. Mutually related content metadata is, for example, metadata which are identical or similar.

When the interface unit receives a discontinue instruction from a user during the intermediate content display process, the display control unit may discontinue content display in accordance with the content sequence and maintain a display state of the intermediate content displayed on a screen at the time the discontinue instruction was received. When the discontinue instruction is cancelled, the display control unit may resume the content display in accordance with the content sequence. Also, a configuration may be set up whereby a new content sequence can be created, starting from the discontinued state. In that case, the interface unit may receive input of reference information to specify a new target content by using the intermediate content displayed on the screen upon the discontinue instruction as the current content, and the content sequence creation unit may likewise create a new content sequence in which one or more intermediate content are inserted between the current content and the target content, which has been newly identified.

The sequence creation unit may include a storage unit which stores a table in which reference information used to specify a content and metadata related to the content are associated, and an intermediate content acquisition unit which references the table, and starting from the current content sequentially searches for another content with metadata that matches the metadata of the preceding content in a display order to be a next intermediate content, and thereby creates the content sequence that ends with the target content.

The storage unit may store both a first table in which content reference information and a list of metadata related to the content are associated, and a second table in which metadata and a list of content reference information related to the metadata are associated. The intermediate content acquisition unit may reference the first table and acquire metadata assigned to the preceding content in the display order, and may further reference the second table and select another content assigned to the metadata acquired in relation to the preceding content in the display order as the intermediate content. Thereby, the intermediate content acquisition unit may create the content sequence starting from the current content and ending with the target content with the selected intermediate content placed sequentially in between.

The intermediate content acquisition unit may acquire metadata which is common to both the current content and the target content by referencing the table, and thereby select another content assigned to the common metadata as the intermediate content.

"Common metadata" in effect shall include not only metadata found in a current content and target content which is of an identical nature but also metadata found which is of a similar nature.

The table may associate metadata assigned to content reference information with broader concept metadata, which describe a broader concept for the metadata. The intermediate content acquisition unit may acquire broader concept metadata for the metadata of the preceding content in the display order by referencing the table and then select another content assigned to the broader concept metadata as the next intermediate content.

The intermediate content acquisition unit, using the table as a reference and starting from the target content, may create the content sequence by sequentially searching in reverse order from the display order for intermediate content whose metadata has a match in the table and then connecting a display-order intermediate content search path and a reverse-order intermediate content search path. The intermediate content acquisition unit may connect the display-order intermediate content search path and the reverse-order intermediate content search path upon acquisition of common metadata for both search paths Here, "common metadata" may be metadata related to the main metadata for a content, or may be metadata which is a broader concept for the main metadata. Further, as mentioned previously, "common metadata" shall in effect include not only metadata found of an identical nature but also metadata of a similar nature.

Another embodiment of the present invention provides a content display control method. This method comprises: creating a content sequence in which to switch from display of a current content to display of a target content on a display apparatus, one or more intermediate content, which have been identified as related to one of or both the current content and the target content, are inserted between the current content and the target; and displaying a content in accordance with a created content sequence starting with the current content, proceeding through the intermediate content which are inserted in order, and finally ending with the target content.

It should be appreciated that any combinations of the foregoing components, and any conversions of expressions of the present invention from/into methods, apparatuses, systems, computer programs, data structures, and the like are also intended to constitute applicable embodiments of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 3 is a diagram showing an example of the reference-metadata list association table of FIG. 2;

FIG. 4 is a diagram showing an example of the metadata-reference list association table of FIG. 2;

FIG. 5 is a diagram explaining the process in which a reference sequence which includes intermediate content references is created by the intermediate reference acquisition unit of FIG. 2;

FIG. 9 is a diagram explaining another example of a configuration of the reference-metadata list association table of FIG. 2;

DETAILED DESCRIPTION OF THE INVENTION

The invention will now be described by reference to the preferred embodiments. This does not intend to limit the scope of the present invention, but to exemplify the invention.

Figure 1:
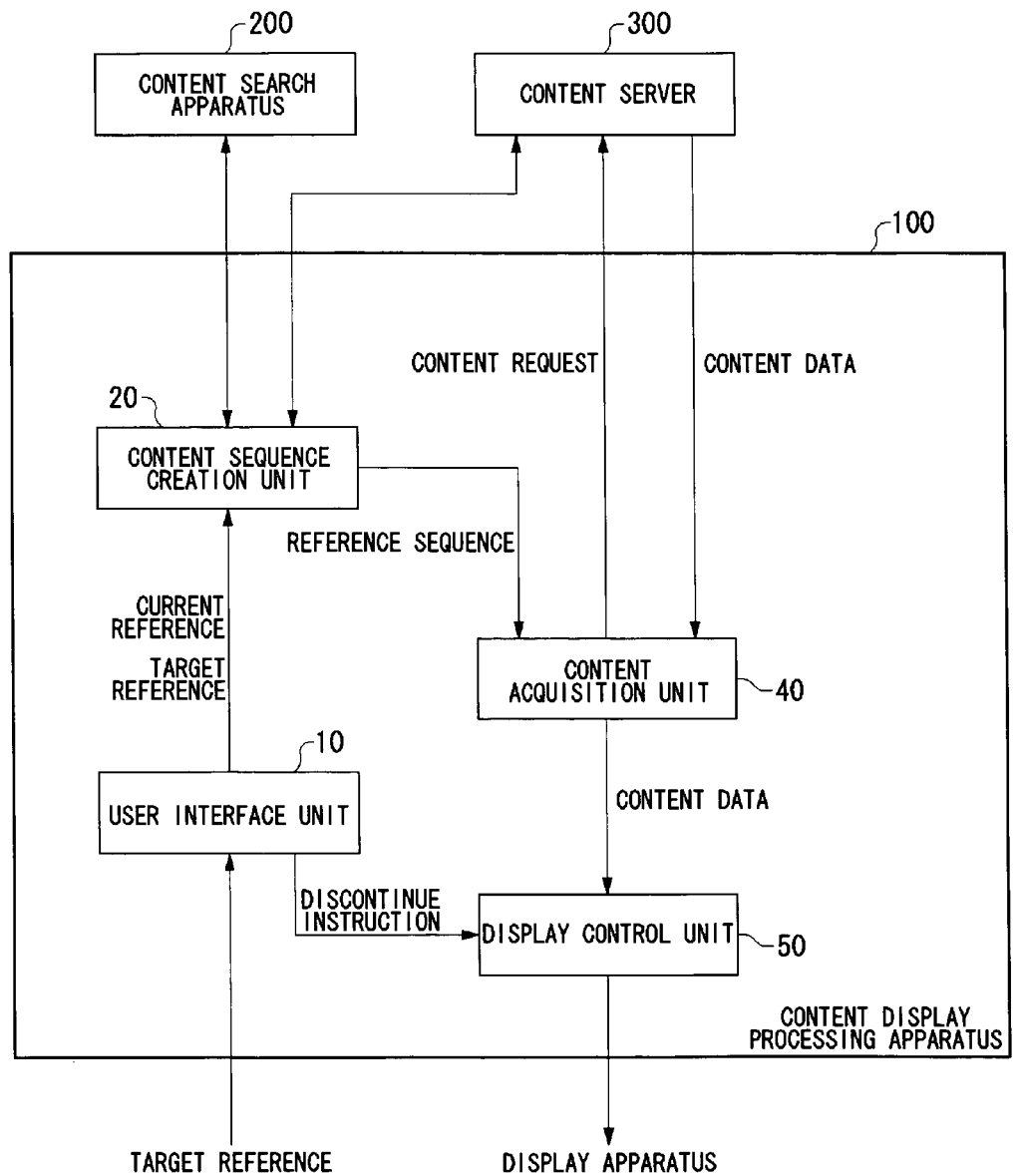
FIG. 1 is a block diagram of a content display system according to an embodiment.

FIG. 1 is a block diagram of a content display system according to an embodiment. The content display system includes a content display processing apparatus 100, a content search apparatus 200, and a content server 300, which are connected by a network.

The content display processing apparatus 100 does display processing of content to be viewed by a user and supplies data to be displayed to a display apparatus. The content display processing apparatus 100 may be, for example, a data processing apparatus like a personal computer or a portable terminal.

The content search apparatus 200 receives a content search request based on metadata from the content display processing apparatus 100, searches for a content related to the specified metadata through a network, and thereby supplies information regarding the storage location of the identified content to the content display processing apparatus 100. The content search apparatus 200 may be, for example, a search server on the Internet.

The content server 300 is a server which supplies content via a network. The content server 300 may be, for example, a server which supplies content such as text, still images, moving images, or 3D models.

Components of the content display processing apparatus 100 will be explained. The user interface unit 10 is an interface which receives a content search instruction and a specific content display instruction from a user, and as one of its functions, has a browser function to use the WWW (World Wide Web) service.

The user interface unit 10 has information to reference a current content, which is currently being displayed on the display apparatus connected to the content display processing apparatus 100. The information to reference the current content is hereafter referred to as "current reference."

The user interface unit 10 receives from a user an input of information to reference a target content which the user wants to have displayed on the display apparatus. The information to reference the target content is hereafter referred to as "target reference."

For example, the current reference and the target reference may be, respectively, reference information uniquely specifying the storage locations of the current content and the target content on a network, such as a URL (Uniform Resource Locator).

The user interface unit 10 provides the current reference and the target reference to the content sequence creation unit 20.

The content sequence creation unit 20 acquires references for one or more intermediate content which form a chain-like link between the current content specified by the current reference and the target content specified by the target reference, thereby creating a reference sequence in which references for respective content going from the current content to the intermediate content to the target content are aligned in a display order. The content sequence creation unit 20 provides the created reference sequence to the content acquisition unit 40.

Here, the structure in which the content sequence creation unit 20 is set up within the content display processing apparatus 100 will be described, however, the content sequence creation unit 20 may also be set up within the content server 300 or a different data processing apparatus connected to a network.

The content acquisition unit 40 sends the content server 300 a request for one or more intermediate content to follow the current content and for a target content, based on the reference sequence specified by the content sequence creation unit 20, and receives the corresponding content data from the content server 300.

The content acquisition unit 40 provides the acquired intermediate content data and the target content data to the display control unit 50.

The display control unit 50 controls content display by passing data to a display apparatus so that a content display is made in accordance with the reference sequence order starting from the current content, proceeding through the intermediate content in order, and finally ending with the target content.

When content display switching control is done by the display control unit 50 so that intermediate content is displayed on a screen, a user may give the user interface unit 10 an instruction to discontinue the content display switching at any point in time. The user may give this discontinue instruction through an operation, for example, by pressing the stop button on a browser or by clicking on a displayed content with a mouse.

The user interface unit 10 sends the discontinue instruction given by the user to the display control unit 50. The display control unit 50 receives the discontinue instruction and thereby discontinues the sequential display switching of intermediate content in accordance with the reference sequence and does control so as to keep displayed the intermediate content which was displayed at the time of the discontinue instruction.

Figure 2:
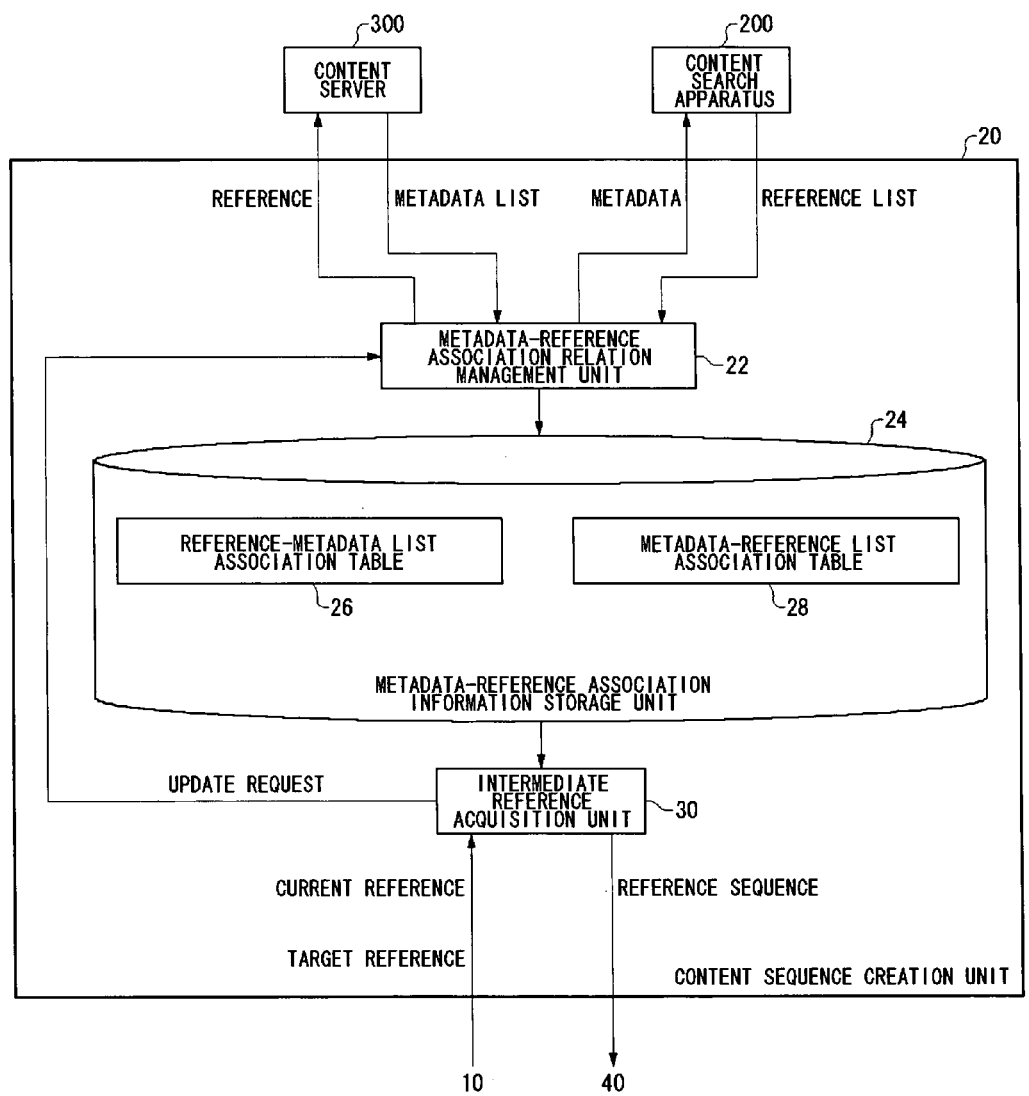
FIG. 2 is a diagram explaining a detailed configuration of the content sequence creation unit of FIG. 1.

FIG. 2 is a diagram explaining a detailed configuration of a content sequence creation unit 20.

The intermediate reference acquisition unit 30 receives a content reference and a target reference from the user interface unit 10, and thereby sends a database update request to the metadata-reference association relation management unit 22.

The metadata-reference association relation management unit 22 stores information related to association relations between content related metadata and content references in the metadata-reference association information storage unit 24 and thereby manages the database. Here, the metadata may be meta-information existing within the content beforehand or information extracted through a content analysis.

The metadata-reference association relation management unit 22 sends the content server 300 an inquiry specifying a reference and receives from the content server 300 a list of metadata related to the content specified by the reference.

The content server 300 may use RDF (Resource Description Framework) to extract metadata from a content. RDF is a convention to provide a framework for describing metadata of resources on the Web through which the content server 300 may acquire content metadata from this metadata and a link to content related to the content.

The metadata-reference association relation management unit 22 creates a reference-metadata list association table 26 in which the metadata list acquired from the content server 300 is assigned to a reference and stores it in the metadata-reference association information storage unit 24.

The metadata-reference association relation management unit 22 makes a content search request by specifying metadata to the content search apparatus 200. The content search apparatus 200 searches for a content related to the specified metadata and provides a list of references for the content to the metadata-reference association relation management unit 22.

The metadata-reference association relation management unit 22 creates a metadata-reference list association table 28 in which the reference list acquired from the content search apparatus 200 is assigned to metadata and stores it in the metadata-reference association information storage unit 24.

The metadata-reference association relation management unit 22 receives a database update request from the intermediate reference acquisition unit 30 and thereby appropriately updates the reference-metadata list association table 26 and the metadata-reference list association table 28.

The intermediate reference acquisition unit 30, by referencing the reference-metadata list association table 26 and the metadata-reference list association table 28, which are stored in the metadata-reference association information storage unit 24, acquires intermediate content to form a chain-like link between a current content and a target content through metadata matching, and creates a content reference sequence starting from the current content, proceeding through the intermediate content and ending with the target content, and outputs it to the content acquisition unit 40.

It should be noted that if the association information stored in the metadata-reference association information storage unit 24 is the most recent and if the information necessary for creating a reference sequence is already stored, the intermediate reference acquisition unit 30 creates a reference sequence using the association information stored in the metadata-reference association information storage unit 24 without sending a database update request to the metadata-reference association relation management unit 22.

FIG. 3 is a diagram showing an example of a reference-metadata list association table 26. To the reference 1, the metadata 1 and the metadata 4 are assigned. Suppose this reference 1 is a current reference.

To the reference 2, the metadata 1, the metadata 2, and the metadata 5 are assigned, and to the reference 3, the metadata 2 and the metadata 3 are assigned. Suppose that the reference 2 and the reference 3 are neither a current reference nor a target reference, but that they are content references found from the metadata. The reference 2 and the reference 3 are possible intermediate content references.

To the reference 4, the metadata 3 is assigned. Suppose the reference 4 is a target reference.

FIG. 4 is a diagram showing an example of a metadata-reference list association table 28. To the metadata 1, the reference 1 and the reference 2 are assigned, to the metadata 2, the reference 2 and the reference 3 are assigned, and to the metadata 3, the reference 3 and the reference 4 are assigned.

FIGS. 5A and 5B are diagrams explaining a process whereby a reference sequence, which includes intermediate content references, is created by an intermediate reference acquisition unit 30.

FIG. 5A shows a work area when the intermediate reference acquisition unit 30 creates a reference sequence through metadata matching.

The intermediate reference acquisition unit 30, with reference to the first line of the reference-metadata list association table 26 of FIG. 3, selects one metadata 1 assigned to the reference 1 which is a current reference, and thereby writes the reference 1 and the selected metadata 1 in the first line of the work area (reference numeral 71).

Next, the intermediate reference acquisition unit 30 references the first line of the metadata reference list association table 28 of FIG. 4, and thereby acquires the reference 2 assigned to the metadata 1, which is not a current content reference but an intermediate content reference. Further, the intermediate reference acquisition unit 30 references the second line of the reference-metadata list association table 26 of FIG. 3, and thereby acquires the metadata 2 assigned to the reference 2, which is different from the metadata 1 assigned to the reference 2. The intermediate reference acquisition unit 30 writes the metadata 1, the reference 2, and the metadata 2 in the second line of the work area (reference numeral 72).

In like manner, the intermediate reference acquisition unit 30 references the second line of the metadata-reference list association table 28 of FIG. 4, and thereby acquires the reference 3 for the intermediate content assigned to the metadata 2, and it further references the third line of the reference-metadata list association table 26 of FIG. 3, and thereby acquires the metadata 3 assigned to the reference 3. The intermediate reference acquisition unit 30 writes the metadata 2, the reference 3, and the metadata 3 in the third line of the work area (reference numeral 73).

Next, the intermediate reference acquisition unit 30 references the third line of the metadata reference list association table 28 of FIG. 4, and thereby acquires the reference 4 assigned to the metadata 3. Since this reference 4 is a target reference, the intermediate reference acquisition unit 30 writes the metadata 3 and the reference 4 in the fourth line of the work area (reference numeral 74), and hereby finishes metadata matching processing.

It should be noted that a setup may be made so that the intermediate reference acquisition unit 30, by referencing the reference-metadata list association table 26, can determine whether or not the metadata acquired at the end of the row of each line of the work area is metadata assigned to the target reference, and when the metadata acquired through metadata matching is identical or similar to the metadata for the target reference, metadata matching processing will be discontinued.

For example, the metadata 2 is acquired at the end of the row of the second line of the work area (reference numeral 72), but this is not metadata for the reference 4 which is the target reference stored in the fourth line of the reference-metadata list association table 26 of FIG. 3, therefore, metadata matching continues. In contrast, since the metadata 3 acquired at the end of the row of the third line of the work area (reference numeral 73) is identical to the target reference metadata stored in the fourth line of the reference-metadata list association table 26 of FIG. 3, metadata matching is discontinued at this point.

FIG. 5B shows a reference sequence acquired through metadata matching. By taking out the element in the second row of each line of the work area of FIG. 5A, the reference sequence (the reference 1, the reference 2, the reference 3, the reference 4) is acquired. This is a list in which the references in the content sequence which form a chain-like link between the current content and the target content through intermediate content are aligned in display order.

It should be noted that in order to prevent an unlimited exhaustive search until reaching the target reference, the intermediate reference acquisition unit 30 may restrict the scope of the search domain by doing a reverse-order metadata match beginning from the target reference in combination with a normal-order metadata match beginning from the current reference so that a path connecting the current content and the target content can be found more quickly.

In this case, for the normal-order metadata matching process from the current reference and the reverse-order metadata matching process from the target reference, when identical or similar metadata are found the metadata matching processes may be discontinued and a reference sequence starting from the current reference and reaching the target reference may be created by connecting the normal-order reference sequence starting from the current reference and the reverse-order reference sequence starting from the target reference.

Figure 6:
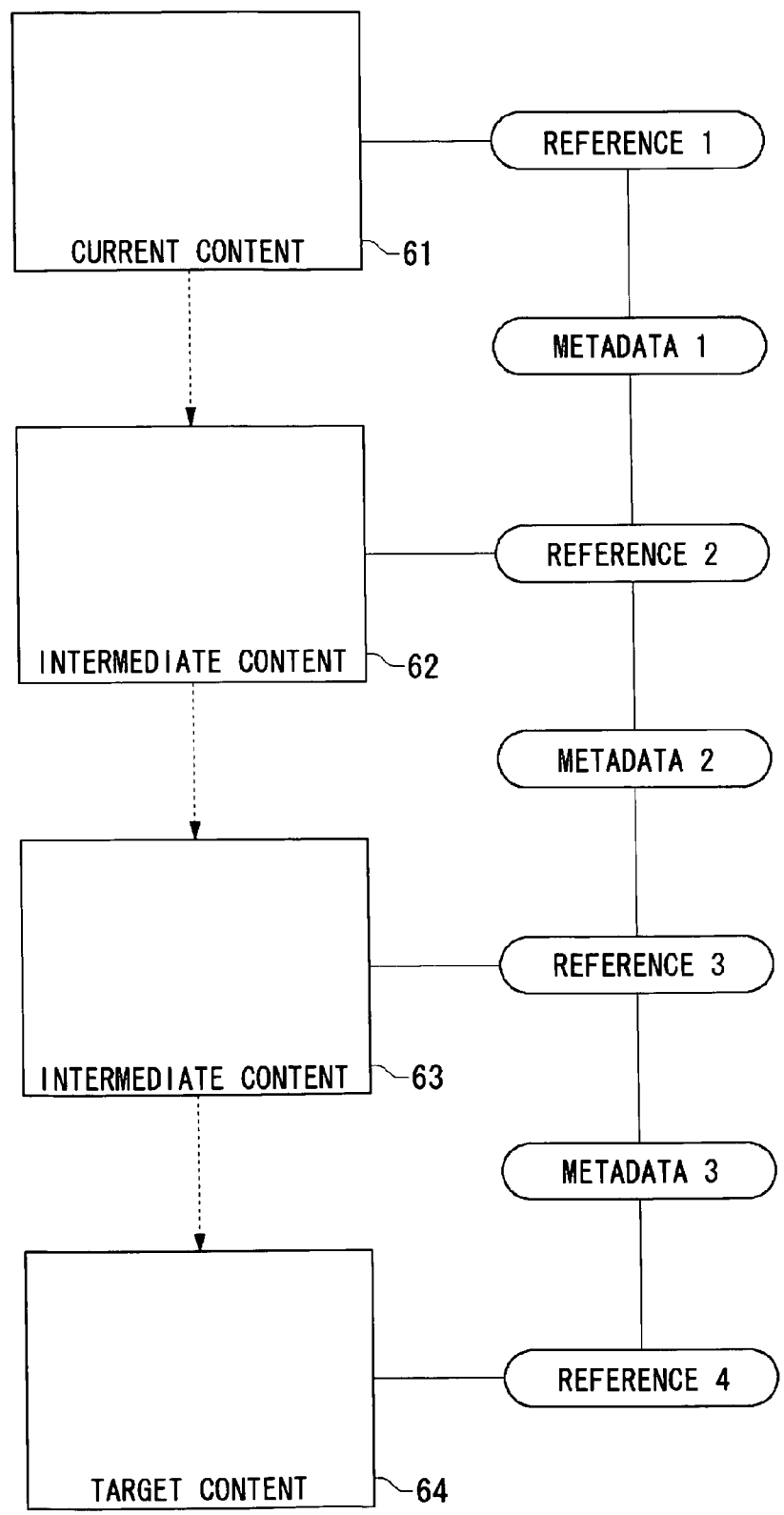
FIG. 6 is a diagram explaining an example where a content is switched to another content with the display controlled by the display control unit of FIG. 1.

FIG. 6 is a diagram explaining an example where a content is switched to another content with the display controlled by the display control unit 50 in accordance with the reference sequence shown in FIG. 5B.

Suppose that the current content 61 is being displayed on a display apparatus screen. The reference 1 for the current content 61 is matched with the reference 2 by the metadata 1, and then the intermediate content 62, specified by the reference 2, is displayed by the display control unit 50.

In like manner, the reference 2 for the intermediate content 62 is matched with the reference 3 by the metadata 2, and then the intermediate content 63, specified by the reference 3, is displayed.

The reference 3 for the intermediate content 63 is matched with the reference 4 by the metadata 3, and lastly the target content 64, specified by the reference 4, is displayed.

Here, the intermediate content are displayed at specified short time intervals, which are set up in consideration of a reasonable wait-time length for a user before the target content is displayed based on the time determined to be necessary for a user to some extent visually recognize the detail of an intermediate content. When it is all right to lengthen the wait-time before the target content is displayed, the intermediate content display time may be lengthened or the number of intermediate content to be inserted may be increased. Further, by estimating the time necessary to complete acquisition of the target content based on the data size of the target content, the network bandwidth, or the like, the number of intermediate content and their play time may be determined based on the estimated time necessary to complete acquisition of the target content.

It should be noted that when a user gives a discontinue instruction during the display of an intermediate content, display switching in accordance with a reference sequence is discontinued, and the intermediate content displayed at that time is kept being displayed. The user can view the intermediate content displayed upon the discontinue instruction at their leisure. Further, when the user cancels the discontinue instruction, display switching resumes in accordance with the reference sequence and in the end the target content is displayed.

Figure 7:
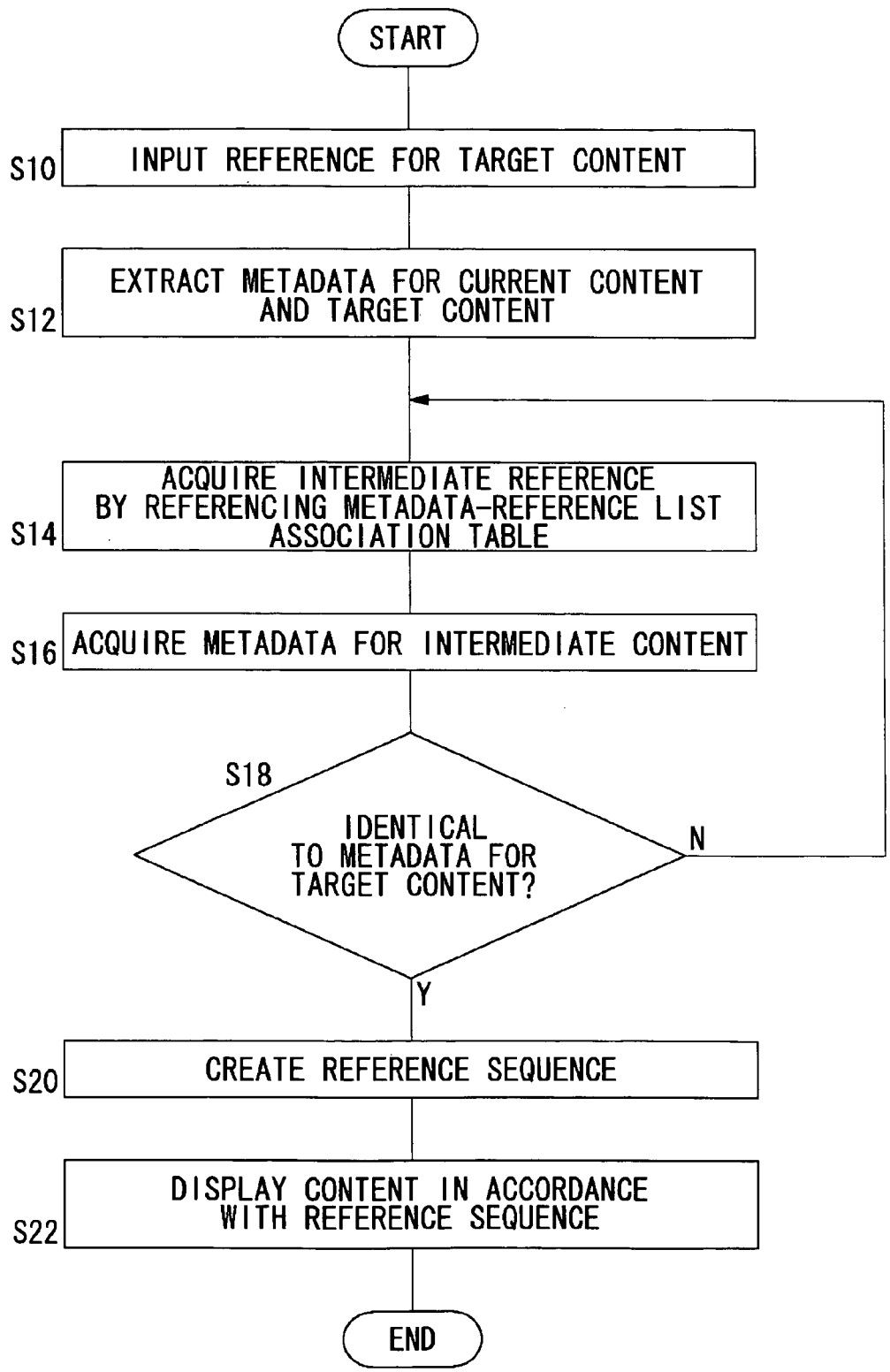
FIG. 7 is a flowchart showing a content display processing procedure by the content display processing apparatus of FIG. 1.

FIG. 7 is a flowchart showing a content display processing procedure by the content display processing apparatus 100.

The user interface unit 10 receives input of a target reference from a user (S10). The metadata-reference association relation management unit 22 in the content sequence creation unit 20 extracts current content metadata and target content metadata by sending an inquiry to the content server 300 (S12).

The intermediate reference acquisition unit 30 references the metadata-reference list association table 28 and thereby acquires a reference for an intermediate content whose metadata matches that of the current content (S14).

Here, when a reference for an intermediate content assigned to the current content metadata does not exist in the metadata-reference list association table 28, the intermediate reference acquisition unit 30 sends a database update request to the metadata-reference association relation management unit 22. The metadata-reference association relation management unit 22 makes a content search request to the content search apparatus 200 by specifying the metadata, acquires a list of references for the content which are possible intermediate content from the content search apparatus 200, and thereby updates the metadata-reference list association table 28.

Next, the intermediate reference acquisition unit 30 references the reference-metadata list association table 26 and thereby acquires metadata assigned to the intermediate content reference (S16).

Here, when metadata for an intermediate content reference does not exist in the reference-metadata list association table 26, the intermediate reference acquisition unit 30 sends a database update request to the metadata-reference association relation management unit 22. The metadata-reference association relation management unit 22 sends an inquiry to the content server 300 by specifying the intermediate content reference, acquires a list of metadata related to the intermediate content from the content server 300, and thereby updates the reference-metadata list association table 26.

The intermediate reference acquisition unit 30 checks whether the intermediate content metadata is identical or similar to the target content metadata (S18).

When the intermediate content metadata is neither identical nor similar to the target content metadata (N of S18), the process goes back to Step S14 to acquire the next intermediate reference.

When the intermediate content metadata is identical or similar to the target content metadata (Y of S18), the intermediate reference acquisition unit 30 creates a reference sequence in which a list of the intermediate references acquired so far is inserted between the current reference and the target reference (S20).

The content acquisition unit 40 acquires content data in accordance with the reference sequence from the content server 300 and provides it to the display control unit 50, and the display control unit 50 controls the content display so that it is made in accordance with the reference sequence starting with the current content, proceeding through the intermediate content in order, and finally ending with the target content.

There are several variations of the intermediate content search procedure by the above-mentioned intermediate reference acquisition unit 30. Hereafter, such variations will be described.

Figure 8:
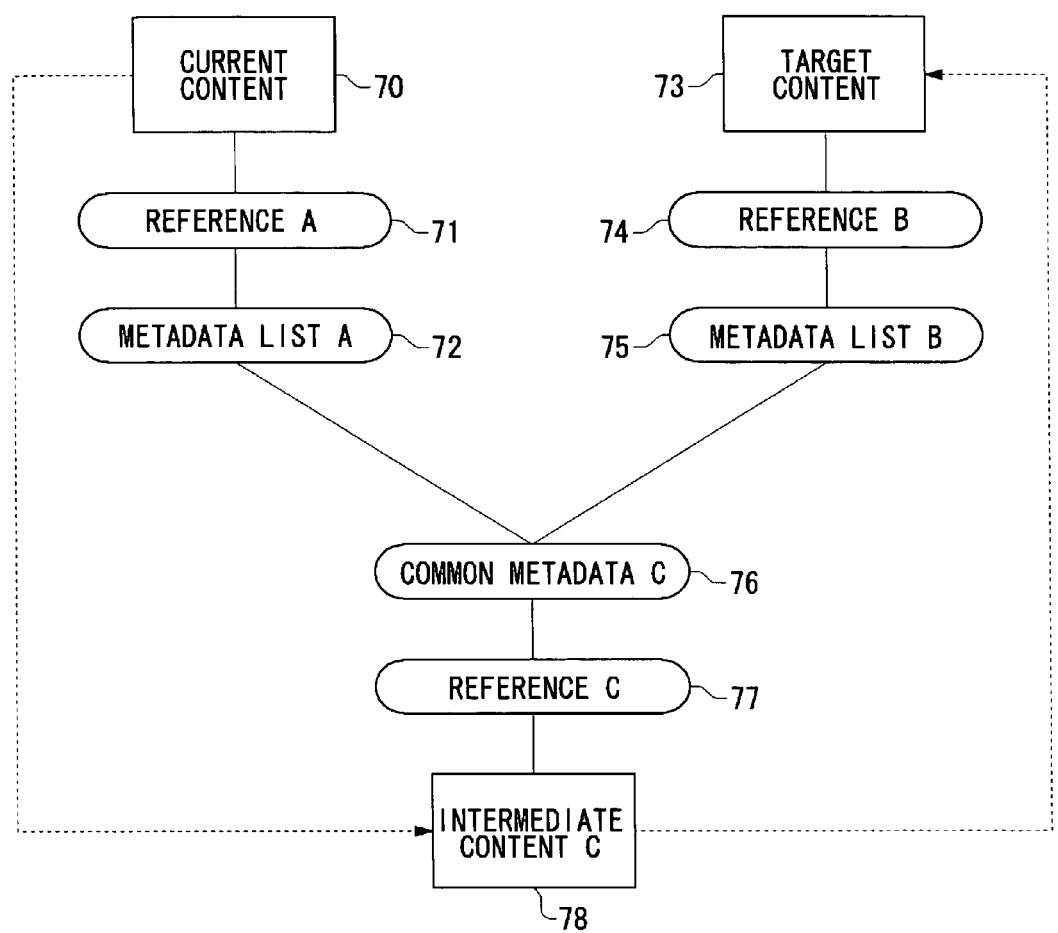
FIG. 8 is a diagram showing the search procedure for intermediate content based on metadata common to the current content metadata list and the target content metadata list.

FIG. 8 is a diagram showing a procedure for searching for an intermediate content based on metadata common to the current content metadata list and the target content metadata list.

The metadata list A (numeral 72) is assigned to the reference A (numeral 71) for the current content (numeral 70), and the association relation between them is stored in the reference-metadata list association table 26.

At the same time, the metadata list B (numeral 75) is assigned to the reference B (numeral 74) for the target content (numeral 73), and the association relation between them is stored in the reference-metadata list association table 26.

The intermediate reference acquisition unit 30 acquires the common metadata C (numeral 76) that are in both the metadata list A for the current content and the metadata list B for the target content. Here, even when there is no common metadata found in both the metadata list A and the metadata list B, if similar metadata are found in the two lists, one of them may be used as the common metadata C.

The intermediate reference acquisition 30 acquires the reference C (numeral 77) assigned to the common metadata C from the metadata-reference association table 28. The content acquisition unit 40 acquires the intermediate content C specified by the reference C (numeral 78).

Using the reference C for the intermediate content thus acquired, the intermediate reference acquisition unit 30 creates a reference sequence (the reference A, the reference C, the reference B).

The display control unit 50 controls the content display so that it is made in order from the current content (numeral 70), to the intermediate content C (numeral 78), to the target content (numeral 73).

When a current content and a target content are an image, examples of common metadata for them include a character appearing in the image or a location in the image. Further, when a content is a 3D image, an object such as a character in 3D virtual space can be common metadata.

By inserting intermediate content determined through the use of common metadata between a current content and a target content, a display effect can be obtained so that the focus is first shifted from the current content to an intermediate content, which is a common point, and then the focus is shifted from the intermediate content to the target content.

FIG. 9 is a diagram explaining another example of a configuration of the reference-metadata list association table 26. In the foregoing explanation, a metadata list was assigned to a content reference, however, to expand this, in addition to the main metadata for the content, broader concept metadata corresponding to a broader concept of the main metadata, and a list of related metadata which is related to the main metadata are assigned to the main metadata and stored.

In the example in the diagram, to the reference 1, the metadata a and the metadata b are assigned as main metadata, and to the metadata a and b, the broader concept metadata au and bu and a plurality of related metadata a1-a3 and b1-b2 are respectively assigned. To the reference 2, the main metadata c is assigned, and to the main metadata c, the broader concept metadata cu and the related metadata c1-c2 are assigned.

Figure 10:
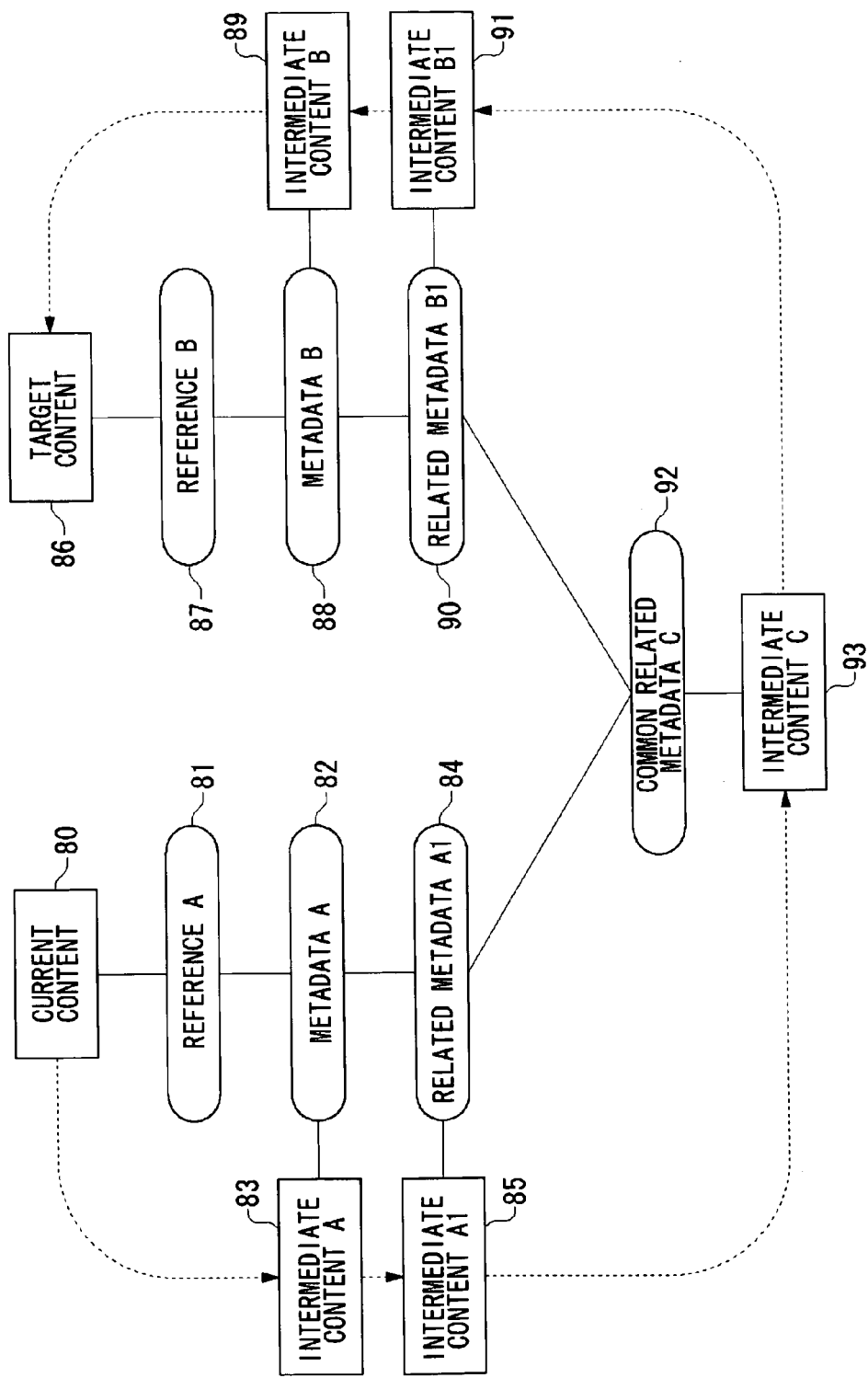
FIG. 10 is a diagram showing the search procedure for intermediate content through matching based on related metadata for a content.

FIG. 10 is a diagram showing a search procedure for intermediate content through matching based on related metadata for a content.

To the reference A (numeral 81) for the current content (numeral 80), a main metadata list is assigned. At the same time a list of related metadata which are relevant to the main metadata is also assigned, and the association relations are stored in the reference-metadata list association table 26.

The intermediate reference acquisition unit 30 acquires one metadata A (numeral 82) from the list of main metadata for the reference A.

The intermediate reference acquisition unit 30 acquires a reference assigned to the metadata A from the metadata-reference list association table 28, and the content acquisition unit 40 references the reference acquired by the intermediate reference acquisition unit 30, and thereby acquires the intermediate content A (numeral 83).

Next, the intermediate reference acquisition unit 30 acquires one related metadata Al (numeral 84) from the list of related metadata for the metadata A.

The intermediate reference acquisition unit 30 acquires a reference assigned to the related metadata Al from the metadata-reference list association table 28, and the content acquisition unit 40 references the reference acquired by the intermediate reference acquisition unit 30, and thereby acquires the intermediate content Al (numeral 85).

At the same time, to the reference B (numeral 87) for the target content (numeral 86), in addition to the list of main metadata, a list of related metadata relevant to the main metadata is assigned, and the association relation is stored in the reference-metadata list association table 26.

The intermediate reference acquisition unit 30 acquires one metadata B (numeral 88) from the list of main metadata for the reference B.

The intermediate reference acquisition unit 30 acquires a reference assigned to the metadata B from the metadata-reference list association table 28, and the content acquisition unit 40 references the reference acquired by the intermediate reference acquisition unit 30, thereby acquiring the intermediate content B (numeral 89).

Next, the intermediate reference acquisition unit 30 acquires one related metadata B1 (numeral 90) from the list of related metadata for the metadata B.

The intermediate reference acquisition unit 30 acquires a reference assigned to the related metadata B1 from the metadata-reference list association table 28, and the content acquisition unit 40 references the reference acquired by the intermediate reference acquisition unit 30, thereby acquiring the intermediate content B1 (numeral 91).

Here, since the related metadata A1 and the related metadata B1 are also respectively the main metadata for the intermediate content A1 and the main metadata for the intermediate content B1, the intermediate reference acquisition unit 30 further searches for an intermediate content in a similar manner by using the lists of related metadata for the main metadata A1 and B1 for the intermediate content A1 and B1. Thus, the intermediate reference acquisition unit 30 bi-directionally searches for an intermediate content based on related metadata, with one search starting from the current content and the other starting from the target content.

Here, suppose that there is a common related metadata C (numeral 92) which is included in both the list of related metadata for the metadata A1 for the intermediate content A1 and the list of related metadata for the metadata B1 for the intermediate content B1. If there is no common related metadata, it is possible to use one of the related metadata which are similar to each other as a substitute.

The intermediate reference acquisition unit 30 acquires a reference assigned to the common related metadata C from the metadata-reference list association table 28, and the content acquisition unit 40 references the reference which was acquired by the intermediate reference acquisition unit 30, thereby acquiring the intermediate content C (numeral 93).

As a result, the normal-order intermediate content search path starting from the current content and the reverse-order intermediate content search path starting from the target content are connected at the intermediate content C which has common related metadata, and a reference sequence starting from the current content proceeding through the intermediate content and ending with the target content is created.

The display control unit 50 controls the content display so that it is made in the following order: the current content (numeral 80), the intermediate content A (numeral 83), the intermediate content A1 (numeral 85), the intermediate content C (numeral 93), the intermediate content B1 (numeral 91), the intermediate content B (numeral 89), the target content (numeral 86).

Compared to a search using the main metadata, by using a plurality of related metadata assigned to the main metadata, it is possible to expand the extent of a search for intermediate content, and the probability increases of finding common related metadata in the normal-order search path searching for intermediate content from the current content in a chain-like fashion and the reverse-order search path searching for intermediate content in a chain-like fashion from the target content. As a result, in addition to creating a highly-diverse intermediate content sequence, it becomes possible to easily find a path which starts from the current content and reaches the target content.

Search control may be done based on the number of related metadata for the content. When combining a normal-order search from the current content with a reverse-order search from the target content, the one with the fewest related metadata is given priority in the search.

When the number N of related metadata for the current content is smaller than the number M of related metadata for the target content, the intermediate reference acquisition unit 30 does a search giving priority to the normal-order search from the current content, and when the number N of related metadata for the current content is larger than the number M of related metadata for the target content, the intermediate reference acquisition unit 30 does a search giving priority to the reverse-order search from the target content.

The intermediate reference acquisition unit 30 may respectively calculate the total number of the related metadata for a content found in the normal-order search from the current content and the related metadata for the content found in the reverse-order search from the target content, and thereby proceed with a search by giving priority to the one with the smaller total number of related metadata.

By giving priority to the one with the smaller number of related metadata, it is possible to prevent the search extent from becoming too broad and to find related metadata common to the search paths in both directions early on, which increases search efficiency.

Figure 11:
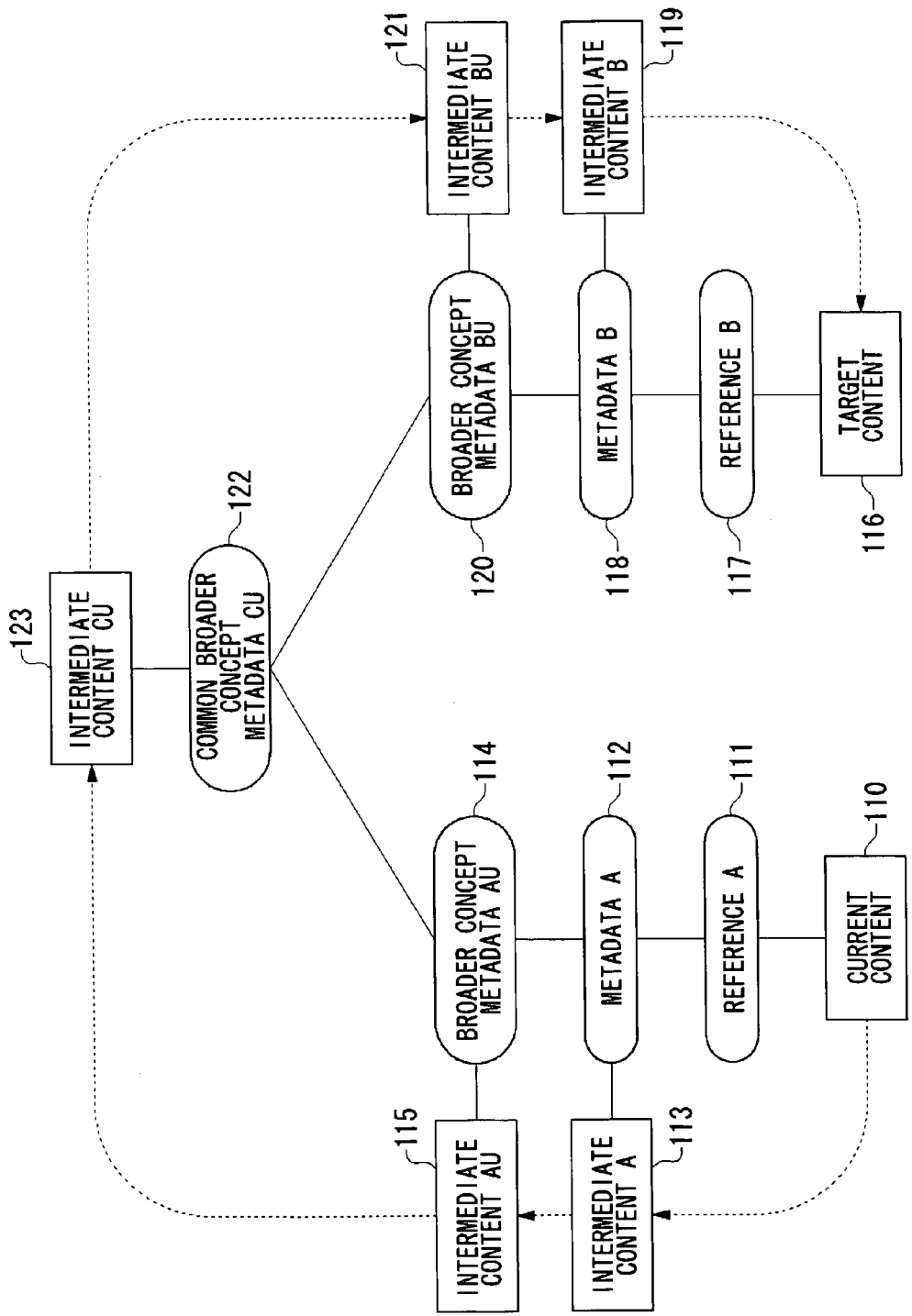
FIG. 11 is a diagram showing the search procedure for intermediate content through matching based on broader concept metadata for a content.

FIG. 11 is a diagram showing the search procedure for intermediate content through matching based on broader concept metadata for content.

To the reference A (numeral 111) for the current content (numeral 110), a main metadata list is assigned, and further, to the main metadata, broader concept metadata describing a broader concept of the main metadata is assigned.

The intermediate reference acquisition unit 30 acquires one metadata A (numeral 112) from the list of main metadata for the reference A, and the content acquisition unit 40 references the reference which is assigned to the metadata A, thereby acquiring the intermediate content A (numeral 113).

Next, the intermediate reference acquisition unit 30 acquires the broader concept metadata AU (numeral 114) assigned to the metadata A, and the content acquisition unit 40 references the reference which is assigned to the broader concept metadata AU, thereby acquiring the intermediate content AU (numeral 115).

At the same time, to the reference B (numeral 117) for the target content (numeral 116), a main metadata list is assigned, and further, to the main metadata, broader concept metadata or a broader concept metadata list is assigned.

The intermediate reference acquisition unit 30 acquires one metadata B (numeral 118) from the list of main metadata for the reference B, and the content acquisition unit 40 references the reference which is assigned to the metadata B, thereby acquiring the intermediate content B (numeral 119).

Next, the intermediate reference acquisition unit 30 acquires the broader concept metadata BU (numeral 120) assigned to the metadata B, and the content acquisition unit 40 references the reference which is assigned to the broader concept metadata BU, thereby acquiring the intermediate content BU (numeral 121).

Here, since the broader concept metadata AU and the broader concept metadata BU are, respectively, the main metadata for the intermediate content AU and the main metadata for the intermediate content BU, the intermediate reference acquisition unit 30 further searches for an intermediate content in a similar manner, by using the broader concept metadata for the main metadata AU for the intermediate content AU, and the broader concept metadata for the main metadata BU for the intermediate content BU. Thus, the intermediate reference acquisition unit 30 bi-directionally searches for an intermediate content based on broader concept metadata with one search starting from the current content and the other starting from the target content.

Here, suppose that the broader concept metadata for the metadata AU for the intermediate content AU and the broader concept metadata for the metadata BU for the intermediate content BU are identical. The intermediate reference acquisition unit 30 selects this as the common broader concept metadata CU (numeral 122). Even if the broader concept metadata for the intermediate content AU and the broader concept metadata for the intermediate content BU are not identical, if they are similar, one of the broader concept metadata may be used as a common broader concept metadata.

The content acquisition unit 40 references the reference which is assigned to the common broader concept metadata CU, and thereby acquires the intermediate content CU (numeral 123).

As a result, the normal-order intermediate content search path starting from the current content and the reverse-order intermediate content search path starting from the target content are connected at the intermediate content CU which has a common broader concept metadata, and thereby a reference sequence is created.

The display control unit 50 controls the content display so that it is made in the following order: the current content (numeral 110), the intermediate content A (numeral 113), the intermediate content AU (numeral 115), the intermediate content CU (numeral 123), the intermediate content BU (numeral 121), the intermediate content B (numeral 119), the target content (numeral 116).

When the broader concept metadata for the intermediate content AU and the broader concept metadata for the intermediate content BU are neither identical nor similar, control may be done so that the intermediate content BU is simply displayed after the intermediate content AU.

Examples of broader concept metadata will be described. Suppose that both a current content and a target content are a movie, and the broader concept metadata AU for the current content is "suspense movie" and the broader concept metadata BU for the target content is "romance movie." In this case, the broader concept metadata for the current content and the broader concept metadata for the target content are not identical. However, the broader concept metadata for the intermediate content AU having "suspense movie" as metadata is "movie" and the broader concept metadata for the intermediate content BU having "romance movie" as metadata is also "movie," therefore, by reaching the common broader concept metadata CU and thereby selecting the intermediate content CU having "movie" as metadata, it is possible to connect the broader conceptualization paths, which are moving towards each other from opposite directions, with one starting from the current content and the other starting from the target content, and thereby create an intermediate content sequence.

Even when there is no common metadata element between the current content and the target content, through broader conceptualization, the chances of finding some common element increases, therefore, by repetitively doing a search using broader concept metadata, it becomes easier to create an intermediate content sequence with continuity on a conceptual basis.

By inserting intermediate content linked like a chain by broader concept metadata between a current content and a target content, a display effect can be obtained in which following the current content, the highly conceptualized intermediate content related to it is sequentially displayed in ascending order until the highest-concept intermediate content is reached, from which the highly conceptualized intermediate content related to the target content is displayed in descending order until the narrowest-concept intermediate content related to the target content is reached and then the target content is finally displayed.

A concept level may be set as a general standard for broader concept metadata, and a search may be controlled by using a concept level. A smaller concept level number is given to a broader concept and a larger concept number is given to a narrower concept.

Figure 12:
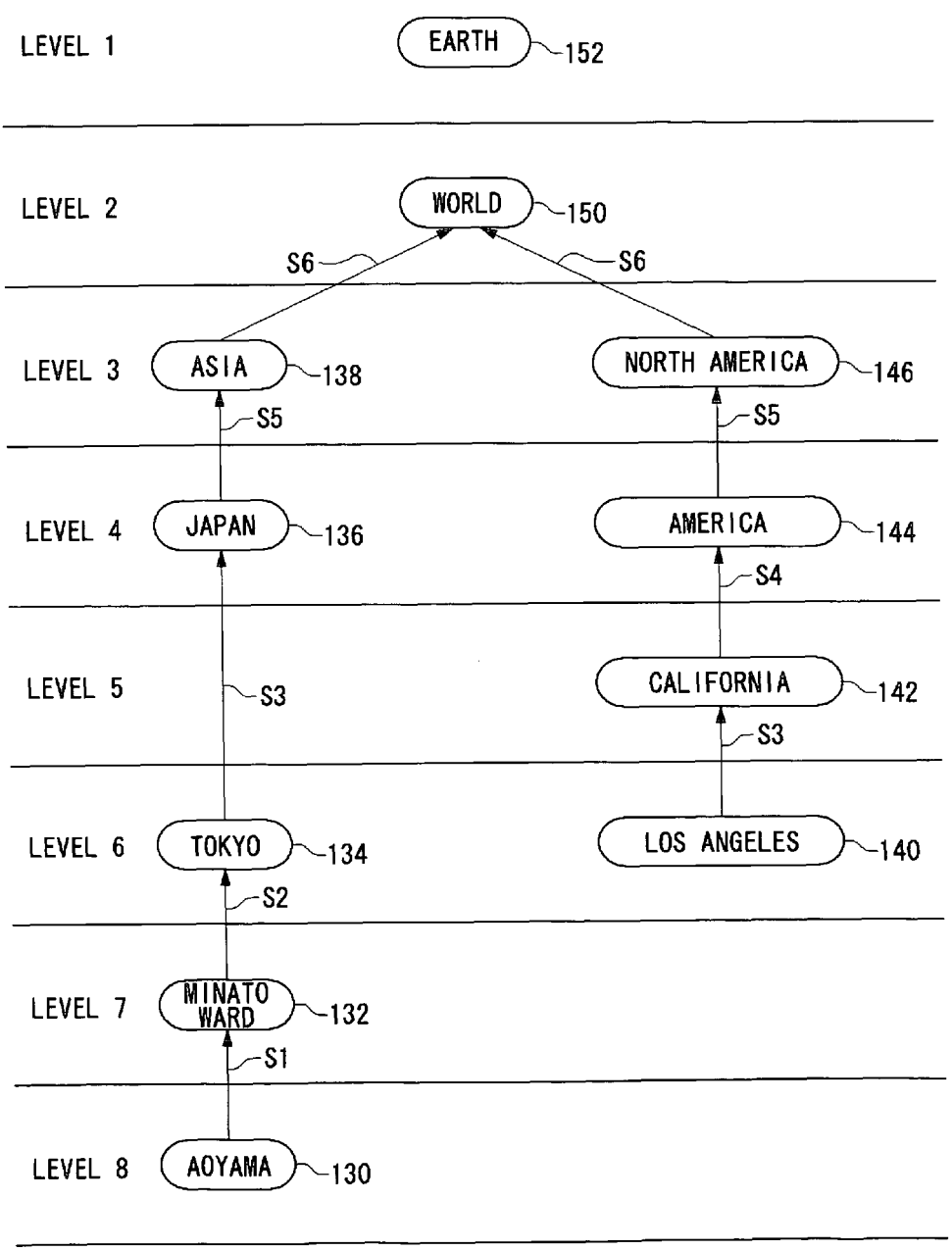
FIG. 12 is a diagram explaining a search control using concept levels.

FIG. 12 is a diagram explaining a search control using concept levels. Here, an example will be described, where concept levels are set by hierarchizing geographic-name concepts.

As shown in the diagram, there are eight concept levels: 1 through 8. The concept in the broadest level (level 1) is "Earth" (numeral 152). The concept for the second broadest level (level 2) is "World" (numeral 150).

The level 3 concept is a continent name, for example, "Asia" (numeral 138) or "North America" (numeral 146). The level 4 concept is a country name. For the narrower concept below "Asia," "Japan" (numeral 136) is shown, and for the narrower concept below "North America," "America" (numeral 144) is shown.

The level 5 concept is a state name. For the narrower concept below "America," "California" (numeral 142) is shown.

The level 6 concept is a city name. For the narrower concept below "Japan," "Tokyo" (numeral 134) is shown, and for the narrower concept below "California," "Los Angeles" (numeral 140) is shown.

The concept for level 7 or below is a location name such as a town name. For the narrower concept below "Tokyo," "Minato Ward" (numeral 132) is shown in level 7, and "Aoyama" (numeral 130) is shown in level 8.

Now, suppose that the current content metadata is "Los Angeles" and the target content metadata is "Aoyama." When combining a normal-order search from the current content with a reverse-order search from the target content, the one with the larger concept level number is given search priority. Hereafter, the search steps will be described.

Step 1: Since the concept level number of the target content metadata "Aoyama" is 8, which is larger than that of the current content metadata "Los Angeles," which is 6, the intermediate reference acquisition unit 30 gives priority to a reverse-order search from the target content, and thereby acquires the broader concept metadata "Minato Ward" (numeral 132) for the metadata "Aoyama" (numeral 130) (S1).

Step 2: Since the concept level number of the target content metadata "Minato Ward" is 7, which is larger than that of the current content metadata "Los Angeles," which is 6, the intermediate reference acquisition unit 30 continues to do a reverse-order search from the target content on a priority basis, thereby acquiring the broader concept metadata "Tokyo" (numeral 134) for the metadata "Minato Ward" (numeral 132) (S2).

Step 3: Since the concept level number of the target content metadata "Tokyo" is 6 and that of the current content metadata "Los Angeles" is also 6, the intermediate reference acquisition unit 30 does a normal-order search from the current content as well as a reverse-order search from the target content. As a result, the broader concept metadata "Japan" (numeral 136) for the metadata "Tokyo" (numeral 134) and the broader concept metadata "California" (numeral 142) for the metadata "Los Angeles" (numeral 140) are acquired (S3).

Step 4: Since the concept level number of the target content metadata "Japan" is 4, which is smaller than that of the current content metadata "California," which is 5, the intermediate reference acquisition unit 30 discontinues the reverse-order search from the target content and does only a normal-order search from the current content. As a result, the broader concept metadata "America" (numeral 144) for the metadata "California" (numeral 142) is acquired (S4).

Step 5: Since the concept level number of the target content metadata "Japan" is 4 and that of the current content metadata "America" is also 4, the intermediate reference acquisition unit 30 resumes a reverse-order search from the target content, and at the same time does a normal-order search from the current content. As a result, the broader concept metadata "Asia" (numeral 138) for the metadata "Japan" (numeral 136) and the broader concept metadata "North America" (numeral 146) for the metadata "America" (numeral 144) are acquired (S5).

Step 6: Since the concept level number of the target content metadata "Asia" and that of the current content metadata "North America" are both 3, the intermediate reference acquisition unit 30 continues bi-directional searching from the target content and the current content, thereby acquiring the broader concept metadata "World" (numeral 150) which is common to both the metadata "Asia" (numeral 138) and the metadata "North America" (numeral 146) (S6). With the acquisition of this common broader concept metadata the search is completed.

The intermediate reference acquisition unit 30 connects the reverse-order search path from the target content with the normal-order search path from the current content, and thereby creates the following conceptual sequence starting from the current content and ending at the target content: "Los Angeles, Calif., America, North America, World, Asia, Japan, Tokyo, Minato Ward, Aoyama."

Thus, even when concurrently doing a normal-order search from the current content and a reverse-order search from the target content, by giving search priority to the one with the larger concept level number, it is possible to coordinate the concept levels in bi-directional searches. This eliminates unnecessary searching and improves efficiency.

The foregoing intermediate content search procedures may be used in combination appropriately. Various further improvements may be made to the foregoing intermediate content search procedures. Hereafter, some improvements, which may be applicable to any of the foregoing intermediate content search procedures, will be described.

(1) Variable Metadata

In the foregoing explanation, the content metadata are fixed, however, content metadata may be made variable in accordance with the content display state. Through storing a table in the metadata-reference association information storage unit 24, in which parameters and metadata lists are associated for the respective content references, the intermediate reference acquisition unit 30 can be set up to select one of the metadata lists by specifying the parameter.

For example, when a content is a scrollable document, what a user sees changes by scrolling position. Through assigning to respective scrolling positions a list of metadata related to the portion of the document visible at the respective scrolling positions and storing them in a table, the intermediate reference acquisition unit 30 acquires the metadata corresponding to the scrolling position, thereby creating a content sequence through metadata matching.

As another example, when a content is a rendered image or photograph of a 3D space, a configuration is possible whereby a different metadata list can be selected depending on the location of view point. For content such as a map, a photographic image of a land surface, or the like, when the view point is distant, names of countries around the world may be set as metadata, and when the view point is nearer, names of cities in a country may be set as metadata, thus the metadata list may be switched based on the viewing location. In the same way when there is a change in the image enlargement ratio different metadata may be selected. Also, different metadata may be selected according to the enlarged area of the image.

(2) Media Type Change

When the media type of the current content and that of the target content are different, a media type change is made at some stage. For example, when the current content is an image and the target content is music, a media type change is made from image to music at one of three points: between the current content and the immediate following intermediate content, or between two adjacent intermediate content, or between the target content and the preceding intermediate content. Here, the metadata for the two content, between which a media type change is made, shall be identical or similar. Further, by using a link preset by metadata between movie and music, for example, a movie content may be linked like a chain to a music content which is the title tune of the movie.

(3) Evaluation by Score Through assigning scores to metadata and storing them in the reference-metadata list association table 26, a setup may be made so that high score metadata is preferentially selected when determining metadata to be used for metadata matching. Also, when selecting common metadata, a setup may be made so that high score metadata is preferentially selected.

A score may be assigned to any of the main metadata, broader concept metadata, or related metadata for a content reference. Scores assigned to the main metadata and the broader concept metadata are indicators to indicate the degree of relativity of the metadata and the broader concept metadata to the content. A score assigned to related metadata is an indicator to indicate the degree of similarity of the related metadata to the main metadata.

When a plurality of score-assigned metadata is assigned to a content, it is possible to use the scores to determine the ordering of priority in a metadata search. For example, in a path search process, high-score metadata is given priority. In the example of FIG. 9, if the score of the metadata b for the reference 1 is higher than the score of the metadata a, the higher-score metadata b is given priority in the path search order. This applies to all of main metadata, broader concept metadata, and related metadata.

When there are a plurality of paths starting from the current content and ending at the target content, a setup may be made so that the scores assigned to content to be gone through in the respective paths are added, and then the path with the highest total score is selected. Alternatively, a setup may be made so that normalized scores assigned to content to be gone through in the respective paths are multiplied, and then the path with the highest total score is selected.

Further, the scores of the respective content metadata may be dynamically variable. A configuration may be made so that the score of the metadata increases or decreases depending on which content is selected as an intermediate content so that the score dynamically changes based on past history.

The score of respective metadata for a content may be assigned individually by a user. This enables a user to customize intermediate content creation. For example, assigning a high score for metadata of interest enables creation of an intermediate content sequence that fits a user's taste.

As described above, according to the content display processing apparatus 100 of the present embodiment, when switching to another content, by using information which associates the content and metadata that have been collected beforehand, it is possible to create an intermediate content sequence in which the content to be switched from and the content to be switched to are linked like a chain via metadata. Displaying the intermediate content in the order of this content sequence enables semantic continuity before and after switching from one content to another. As a result, when the content is switched, a user is not left with the impression that the content was changed abruptly, but can see semantic coherence in the switching of the content.

In addition, when one content is switched to another content, because different intermediate content sequences are created based on the combination of the current content and the target content, unlike when standardized intermediate content is displayed upon content switching there is a rich diversity which keeps the interest of a user.

Further, if some content of interest is found among the intermediate content displayed during the process of content switching, the user can send a discontinue instruction when an intermediate content of interest is displayed, and then view the intermediate content. Instead of experiencing an abrupt change in the switch from the current content to the target content which is negative, a user may find some unexpectedly interesting intermediate content during the process of content switching which is positive.

Up to this point, the present invention has been described in conjunction with the embodiments thereof. The foregoing embodiments have been given solely by way of illustration. It will be understood by those skilled in the art that various modifications may be made to combinations of the foregoing components and processes, and all such modifications are also intended to fall within the scope of the present invention.

In the foregoing explanation, examples of metadata to specify a content include the following:

(a) Keyword

A keyword is a text label given to a content. The keyword may be set up beforehand upon content creation, or extracted from a content.

(b) Characteristics based on content analysis

In the case of a content like a video image, by detecting the amount of a characteristic in the image or extracting an object within the image, some characteristics of the content, for example, "brightness," "laughter," and "intensive movement," can be obtained. For example, when switching from a night scene of a video A to a gun shooting scene of a video B, the amount of the characteristic "darkness" is extracted from the night scene of the video A and the amount of the characteristic "gun sound" is extracted from the gun shooting scene of the video B. Then, as an intermediate content, a video C containing a nighttime gun shooting scene, which has both the characteristics of "darkness" and "gun sound," is selected, and thereby a content sequence whose order is "the video A, the video C, the video B" is created.

(c) Content Creation Time

For example, when switching from a most recently made movie A to an old movie B, with reference to information about the times when the respective movies were made as metadata, a movie C, which was made at a time in between, is selected as the intermediate content, and thereby a content sequence whose order is "the movie A, the movie C, the movie B" is created.

(d) Content Creation Location

For example, when switching from Korean music A to American music B, with reference to information that the music A was created in Seoul (latitude 37 north and longitude 127 east) and the music B was created in Chicago (latitude 41 north and longitude 87 west) as metadata, music C from Japan which is geographically located in between (latitude 38 north and longitude 140 east) is selected as the intermediate content, and thereby a content sequence whose order is "the music A, the music C, the music B" is created.

(e) Information Identifying Users who Have Referenced Content

Information identifying users who have referenced content may be stored as reference history to be referenced as metadata. For example, when switching from a video A to a video B, suppose that there is past reference history that the video A has been referenced by a user A and a user C, and the video B has been referenced by the user A and a user D. Here, a video C, which has been seen by both the user C, who has seen the video A, and the user D, who has seen the video B, is searched for, and thereby selected as the intermediate content to create a content sequence whose order is "the video A, the video C, the video B."

(f) Content-to-content Movement History by Users

The history of a user's movement from one content to another may be stored to be referenced as metadata. For example, when switching from a video A to a video B, suppose that there is a movement history for the video A showing that the video A was switched to from a video C, and there is a movement history for the video B showing that the video C was switched to from the video B. In this case, since the video C is the content which is common to the content-to-content movement history of the video A and that of the video B, the video C may be selected as the intermediate content, and thereby a content sequence whose order is "the video A, the video C, the video B" is created.

In the foregoing setup, references assigned to metadata were stored in the metadata-reference list association table 28, however the references may directly be assigned to the metadata stored in the reference-metadata list association table 26 as a link and be stored. In this way, it is possible to create one table which includes the metadata-reference list association table 28 in the reference-metadata list association table 26.

In this case, a score may be assigned to the linked references of each metadata in the reference-metadata list association table 26, and when searching for intermediate contents to be linked like a chain by metadata, a setup may be made so that a linked reference with a higher score is preferentially selected. Meanwhile, when there are only linked references with low scores, a setup may be made so that the intermediate reference acquisition unit 30 sends a database update request to the metadata-reference association relation management unit 22, and the metadata-reference association relation management unit 22 does a new search, and thereby updates the linked references in the reference-metadata list association table 26.

In the foregoing explanation, when a content sequence is acquired, the current content is displayed at the beginning, then the intermediate contents in the order of the sequence, and the target content at the end, however, by further providing an image interpolation unit to create images to interpolate between adjacent content within the sequence, the display control unit 50 may control the display process by using interpolated images to make continuous content display from the current content through the intermediate content to the target content. As a result, in the transition process from the current content to the target content, content can be displayed with image continuity in addition to having semantic coherence.

The content display processing apparatus 100 may be loaded into a media player. In a media player with the content display processing apparatus 100, by using link information included in metadata added to a content, like a movie, when switching from the content being played to another content, it is possible to switch the display and maintain semantic coherence through inserting intermediate content which are relevant to both the content being played and the content being switched to. In this case, as a substitute for the user interface unit 10 for receiving input of a target reference from a user, an interface unit is set up, which extracts link information from content metadata and inputs it as a target reference. As for the intermediate content to be inserted when switching to another content, the content recorded in the media player may be used, or it may be acquired through a network.

Further, in the media player loaded with the content display processing apparatus 100, in the event a large amount of content such as video images or other content has been accumulated through an automatic video recording function or an automatic content download function, the content display processing apparatus 100 can automatically configure and show a content sequence which is natural, continuous, and narrative by combining the accumulated content. Here, "narrative" means that there is a story nature and a semantic continuity to the content sequence flow. A user can passively watch or listen to the content sequence shown by the media player, and in the process of passively watching or listening to the content sequence it is possible to shift to actively watching or listening to the content from the point where the user becomes interested. In a similar manner, it is also possible to make a shift from an active watching or listening mode to a passive watching or listening mode.

Thus, with the media player showing a content sequence, a user no longer needs to take the trouble to check the large amount of automatically recorded or downloaded content one by one and organize them, but rather, can appropriately select specific content while watching or listening to the content sequence which is created automatically. Conventional media players show a content list using thumbnails, or search for and show a specific content using metadata, however loading the content display processing apparatus 100 in a media player enables the offering of a new style content presentation method whereby appropriate content sequences are created for viewing by a user. In addition, in this case, a random target content may be set up on the media player side appropriately, or the user may set up a target content by specifying the content that the user desires to see at the end.

Intermediate content to be inserted between a current content and a target content may include advertising information regarding the current content or the target content. This enables a user to view an advertisement when the user switches over to the target content, which can enhance advertising effectiveness. The system may be configured so that a server for providing current content or target content provides intermediate content including advertising information to the content display processing apparatus 100.

What is claimed is:

1. A content display control apparatus comprising:
  a user interface unit, which, during a current content being displayed on a display, receives an instruction from a user viewing the current content with reference information specifying a target content that is to be switched from the current content;
  a sequence creation unit that dynamically creates, while the user is viewing the current content, a content sequence in which one or more intermediate contents, which have been identified as related to at least one of the current content and the target content, are inserted between the current content and the target content;
  a storage, which stores the reference information and metadata related to the contents; and
  a display control unit, which displays content in accordance with the created content sequence starting with the current content, proceeding through the one or more intermediate contents, which are dynamically inserted in order, and finally ending with the target content, wherein
  the one or more intermediate contents are linked like a chain via the metadata that characterizes the contents, the insertion of the intermediate contents dynamically increasing a length of the chain, and
  the metadata characterizing the one or more intermediate contents matches the metadata characterizing at least one of the current content and the target content.

2. The content display control apparatus according to claim 1, wherein
  when the user interface unit receives a discontinue instruction from the user during the intermediate content display process, the display control unit discontinues the content display progression in accordance with the content sequence and maintains a display state of the intermediate content displayed on a screen at the time the discontinue instruction was received.

3. The content display control apparatus according to claim 1, wherein
  the sequence creation unit includes:
  a storage unit which stores a table in which reference information used to specify a content and metadata related to the content are associated; and
  an intermediate content acquisition unit which references the table starting from the current content as it sequentially searches for another content with metadata that matches the metadata of the preceding content in a display order to be a next intermediate content, and thereby creates the content sequence that ends with the target content.

4. The content display control apparatus according to claim 3, wherein the intermediate content acquisition unit acquires metadata which is common to both the current content and the target content by referencing the table, and thereby selects another content assigned to the common metadata as the intermediate content.

5. The content display control apparatus according to claim 4, wherein
  the intermediate content acquisition unit, using the table as a reference and starting from the target content, creates the content sequence by sequentially searching in reverse order from the display order for intermediate content whose metadata has a match in the table and then connecting a display-order intermediate content search path and a reverse-order intermediate content search path.

6. The content display control apparatus according to claim 5, wherein
  the intermediate content acquisition unit connects the display-order intermediate content search path and the reverse-order intermediate content search path upon acquisition of common metadata for both search paths.

7. The content display control apparatus according to claim 3, wherein
the table associates metadata assigned to content reference information with broader concept metadata, which describe a broader concept for the metadata; and
the intermediate content acquisition unit acquires broader concept metadata for the metadata of the preceding content in the display order by referencing the table and then selects another content assigned to the broader concept metadata as the next intermediate content.

8. The content display control apparatus according to claim 7, wherein
the intermediate content acquisition unit, using the table as a reference and starting from the target content, creates the content sequence by sequentially searching in reverse order from the display order for intermediate content whose metadata has a match in the table and then connecting a display-order intermediate content search path and a reverse-order intermediate content search path.

9. The content display control apparatus according to claim 8, wherein
the intermediate content acquisition unit connects the display-order intermediate content search path and the reverse-order intermediate content search path upon acquisition of common metadata for both search paths.

10. The content display control apparatus according to claim 3, wherein
the intermediate content acquisition unit, using the table as a reference and starting from the target content, creates the content sequence by sequentially searching in reverse order from the display order for intermediate content whose metadata has a match in the table and then connecting a display-order intermediate content search path and a reverse-order intermediate content search path.

11. The content display control apparatus according to claim 10, wherein
the intermediate content acquisition unit connects the display-order intermediate content search path and the reverse-order intermediate content search path upon acquisition of common metadata for both search paths.

12. A content display control apparatus comprising:
a user interface unit, which, during a current content being displayed on a display, receives an instruction from a user viewing the current content with reference information specifying a target content that is to be switched from the current content;
a sequence creation unit that dynamically creates, while the user is viewing the current content, a content sequence in which one or more intermediate contents, which have been identified as related to at least one of the current content and the target content, are inserted between the current content and the target content;
a storage, which stores the reference information and metadata related to the contents; and
a display control unit, which displays content in accordance with the created content sequence starting with the current content, proceeding through the one or more intermediate contents, which are dynamically inserted in order, and finally ending with the target content, wherein when the user interface unit receives a discontinue instruction from the user during the intermediate content display process, the display control unit discontinues the content display progression in accordance with the content sequence and maintains a display state of the intermediate content displayed on a screen at the time the discontinue instruction was received,
the one or more intermediate contents are linked like a chain via the metadata that characterizes the contents, the insertion of the intermediate contents dynamically increasing a length of the chain, and
the metadata characterizing the one or more intermediate contents matches the metadata characterizing at least one of the current content and the target content.

13. A content display control method comprising:
receiving input of reference information from a user specifying a target content that is to be switched from a current content, while the current content is being displayed;
creating a content sequence in which one or more intermediate contents, which have been identified as related to at least one of the current content and the target content, are inserted between the current content and the target content; and
displaying content in accordance with the created content sequence starting with the current content, proceeding through the one or more intermediate contents which are dynamically inserted in order, and finally ending with the target content, wherein
the one or more intermediate contents are linked like a chain via metadata that characterizes the contents, the insertion of the intermediate contents dynamically increasing a length of the chain, and
the metadata characterizing the one or more intermediate contents matches the metadata characterizing at least one of the current content and the target content.

14. A computer program stored in a computer-readable storage medium comprising:
a user interface module, which, during a current content being displayed on a display, receives an instruction from a user viewing the current content with reference information specifying a target content that is to be switched from the current content;
a creating module that dynamically creates, while the user is viewing the current content a content sequence in which one or more intermediate contents, which have been identified as related to at least one of the current content and the target content, are inserted between the current content and the target content; and
a display control module, which displays content in accordance with the created content sequence starting with the current content, proceeding through the one of more intermediate contents, which are dynamically inserted in order, and finally ending with the target content, wherein
the one or more intermediate contents are linked like a chain via metadata that characterizes the contents, the insertion of the intermediate contents dynamically increasing a length of the chain, and
the metadata characterizing the one or more intermediate contents matches the metadata characterizing at least one of the current content and the target content.

* * * * *